United States Patent [19]
Bargeton et al.

[11] 4,365,247
[45] Dec. 21, 1982

[54] END STATION DIGITAL TRANSMISSION LINK RELIEVING SYSTEM

[75] Inventors: Gilbert L. Bargeton, Paris; Claude P. Beynie, La Varenne, both of France

[73] Assignee: Societe Anonyme de Telecommunications, Paris, France

[21] Appl. No.: 223,091

[22] Filed: Jan. 7, 1981

[30] Foreign Application Priority Data

Jan. 11, 1980 [FR] France ............................ 80 00621

[51] Int. Cl.³ .................... H04B 3/46; H04Q 9/00
[52] U.S. Cl. ..................... 340/825.01; 179/175.35; 371/8
[58] Field of Search ............... 370/16; 340/147 SC, 340/147 R, 825.01; 179/175.3 R, 175.3 S; 371/8; 324/51; 178/69 G

[56] References Cited

U.S. PATENT DOCUMENTS

| 3,864,533 | 2/1975 | Erlund | 340/147 SC |
| 4,009,469 | 2/1977 | Boudreau et al. | 340/147 SC |
| 4,068,105 | 1/1978 | Jain et al. | 179/175.3 R |
| 4,159,470 | 6/1979 | Strojny et al. | 179/175.3 S |
| 4,264,893 | 4/1981 | Hutch | 340/147 SC |

OTHER PUBLICATIONS

"Sécurisation et Supervision d'un Réseau Numérique Urbain", Chomette et al., L'Echo des Recherches, Jan. 1979, pp. 12-19.

"T1 Protection Switching", Wuertele, Nat'l. Telecommunications Conference Review, 1973, Record No. 2, 1975.

Primary Examiner—Thomas A. Robinson
Attorney, Agent, or Firm—Lowe, King, Price & Becker

[57] ABSTRACT

The system relieves a transmission working line included in a bidirectional digital link having N working lines and P spare lines between two end stations. In response to the detection of a transmission fault on the working line, the switching units of the stations perform a first exchange of order signals via a selected free spare line, and then a first switch-over of the data related to the faulty working line to the spare line. After the faulty working line has been repaired, to prevent continued data transmission along the spare line, a second exchange of order signals triggers a second switch-over so the system reverts to normal operation. The second exchange of order signals takes place along the repaired line while data related to the repaired line continues to be transmitted via the spare line. During the repair of the preceding faulty working line, a relief procedure of a high priority working line may take place via the selected spare line.

7 Claims, 4 Drawing Figures

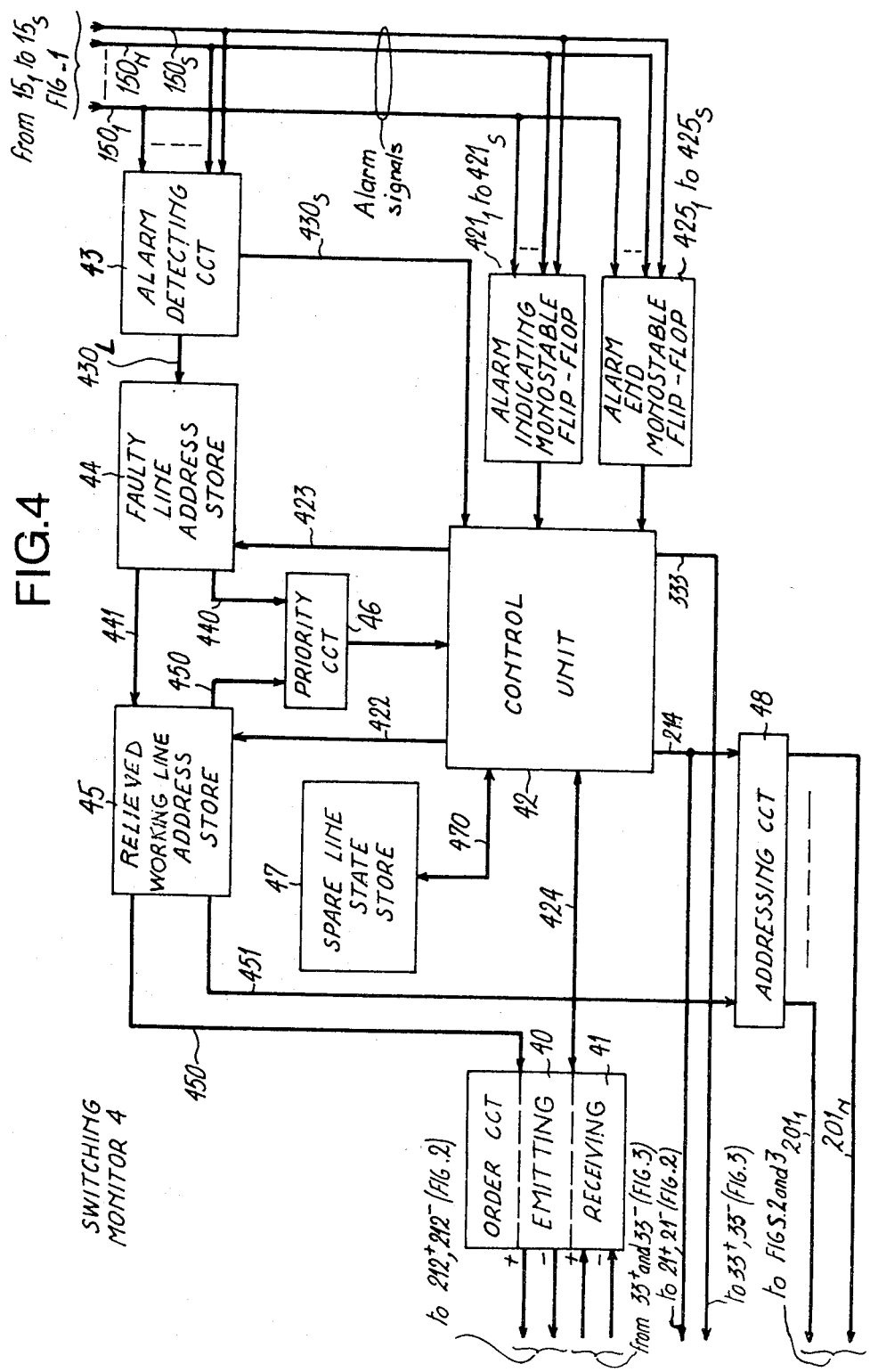

END STATION DIGITAL TRANSMISSION LINK RELIEVING SYSTEM

CROSS REFERENCES TO RELATED APPLICATIONS

Applicants hereby cross reference to their French Patent Application No. PV 80 00621, filed Jan. 11, 1980 and claim priority thereunder following the provisions of 35 U.S.C. 119.

BACKGROUND OF THE INVENTION

1. Field of the Invention

The present invention relates to a system for relieving a digital transmission link having N bidirectional working lines and P bidirectional spare lines where $N > P$. This link is connected between two end stations of a digital transmission system. Each end station comprises a bidirectional switching unit controlled by a monitor which exchanges order signals with the other end station through the link.

2. Description of the Prior Art

The article by A. Chomette, J. Guiomar and M. Robinet entitled "Sécurisation et Supervision d'un réseau numérique urbain" (relieving and monitoring an urban digital network), published in the French review "l'Echo des Recherches", January 1979, pages 12 to 19, describes a method for relieving a working line in a digital transmission link. According to this article, the prime function of a switching unit consists of switching the ends of a working line over to a pre-selected spare line, as soon as a transmission fault in the working line is detected. This precludes virtually any loss of the data transmitted by the failed line, i.e. a break in the communications in progress carried by the working line whilst the repair thereof is going on.

With this in mind, the emitting end of the switching unit in an end station that is intended to emit data to the other station via the transmission link comprises, for each working transmission line, first switching means that are associated with each spare line. After an alarm indicating a transmission fault in the said working line has been detected, the first switching means allows the emitting end of the faulty working line to be connected to the spare line, in order to transmit data related to the faulty line. These switching means are, when there is no alarm, connected solely to the spare line. When this spare line is selected, the switching means enables the monitor to emit first order signals to the other end station, prior to any first switch-over. The receiving end of the switching unit in an end station which is intended to receive data from the other end station via the transmission link, comprises, for each working transmission line, second switching means connected to each spare line. After an alarm related to the failed line has been detected, the second switching means makes it possible to connect the spare line to the receiving end of the failed line for receiving data related to the failed line. The second switching means are, in the absence of an alarm, connected solely to the spare line. The second switching means enables, via this selected spare line, the monitor to receive the first order signals coming from the switching unit of the other end station. Thereafter, the second switching means enables the monitor downstream of the faulty line to receive the data related to the faulty line whilst being repaired. Finally, the second switching means enables the monitor to receive second order signals after the alarm due to the line repair has ceased. The second and last exchanges of order signals are also performed along the selected spare line and, as a result, require a momentary break in the communications related to the line. Following this second order exchange, a second switch-over re-establishes normal transmission along the repaired line.

In the straightforward case of the number of spare lines being equal to unity ($P = 1$), a relief method of this type does not provide for a line being available for transmitting orders when a working line has been relieved. Indeed, two cases may arise in which it is important to be in a position to exchange orders between the switching units of the two end stations. The first case is that of a second working line in the same link becoming faulty. The second case is that of the faulty working line, with communications routed via the spare line, being restored to working order.

In the first case, if the second faulty working line has priority, there is no drawback in breaking the spare line traffic for conveying order signals and in assigning this spare line to the relief of the priority failed working line; should, however, the second faulty line not have priority over the first, then said second working line is not relieved and its traffic is interrupted.

In the second case, in relation to repairing the faulty line, second order signals must be exchanged before ordering the switch-over of traffic from the spare line to the repaired working line. According to the preceding article, this second exchange of order signals can also come about by momentarily breaking the spare line traffic, which may be very annoying, in particular should the relieved line be a priority line or a line conveying data, for example, between a terminal and a computor where the transmission must not be broken.

In the article by James W. Wuertele published in the National Telecommunications Conference review, 1973, Conference Record Vol. 2, New York (U.S.), is described a relieving method which obviates the drawbacks of the method in the article by A. Chomette et al. The second exchange of order signals does not occur via the pre-selected spare line, but via the repaired line whilst the data related to this repaired line continues to be transmitted along the pre-selected spare line. As a result, these conditions do not break the traffic related to the repaired working line.

However, according to the second preceding article, the receiving end of an end station switching unit is connected to the working line throughout the repair time, just before the second switch-over, in order to receive test signals via the latter. Thus, just before the second switch-over, i.e. before the second exchange of orders, the faulty working line is connected to the order emitting and receiving circuits in the end stations. If a second working line were to fail before the first one has been repaired and the second line were to have priority over the first, no exchange of orders could occur between the stations until the first working line had been repaired.

OBJECT OF THE INVENTION

The principal object of this invention is to permit a second exchange of order signals for relieving a priority working line, even if one working line is under repair.

SUMMARY OF THE INVENTION

According to the present invention, there is provided a relieving system for relieving a plurality of bidirectional digital data transmission working lines connected between two end stations of a digital transmission system, said relieving system comprising a plurality of bidirectional digital transmission spare lines connected between said end stations, each of said end stations comprising:

means for detecting transmission faults on each of said working lines;

means for selecting a free spare line in response to the detection of transmission faults on a working line;

means for emitting digital order signals to the other end station;

means for receiving digital order signals from said other end station;

first and second switching means for connecting said order signal emitting and receiving means to the selected free spare line such that said order signal emitting and receiving means of said end stations exchange first order signals therebetween in response to the detection of a transmission fault on said working line, and for connecting the emitting and receiving ends of said faulty working line to said selected free spare line in response to said first order signals from said other station;

third switching means for connecting said order signal emitting means to said faulty working line such that said order signal emitting means transmits second order signals on said faulty working line in response to said first order signals from said other station;

fourth switching means for connecting said order signal receiving means to said faulty working line in response to the stop of said transmission fault detection and the repair of said working line;

said transmission fault detecting means controlling said first, second, third and fourth switching means in response to said second order signals received in said order signal receiving means such that said emitting and receiving ends of said repaired working line are connected to said working line and are disconnected from said selected spare line;

said order signal receiving means holding a connection to said selected spare line from the start of exchange of said first order signals and up to just before said stop of said transmission fault detection on said working line such that said order signal receiving means can receive order signals from said other station on said selected spare line in response to the transmission fault which relates to another working line and which is detected in said other end station.

Because the order signal receiving means of the switching unit in each end station are connected to the spare line during the repair of a faulty working line, it is possible to receive order signals via the spare line, so as to trigger the relief procedure of a priority working line during the repair of the preceding failed working line.

BRIEF DESCRIPTION OF THE DRAWING

Other objects, features and advantages of the invention will be apparent from the following more particular description of the preferred embodiments of the invention as illustrated in the accompanying drawings, wherein:

FIG. 4 is a schematic block diagram of the switching monitor in an end station.

DESCRIPTION OF THE PREFERRED EMBODIMENTS

Figure 1:
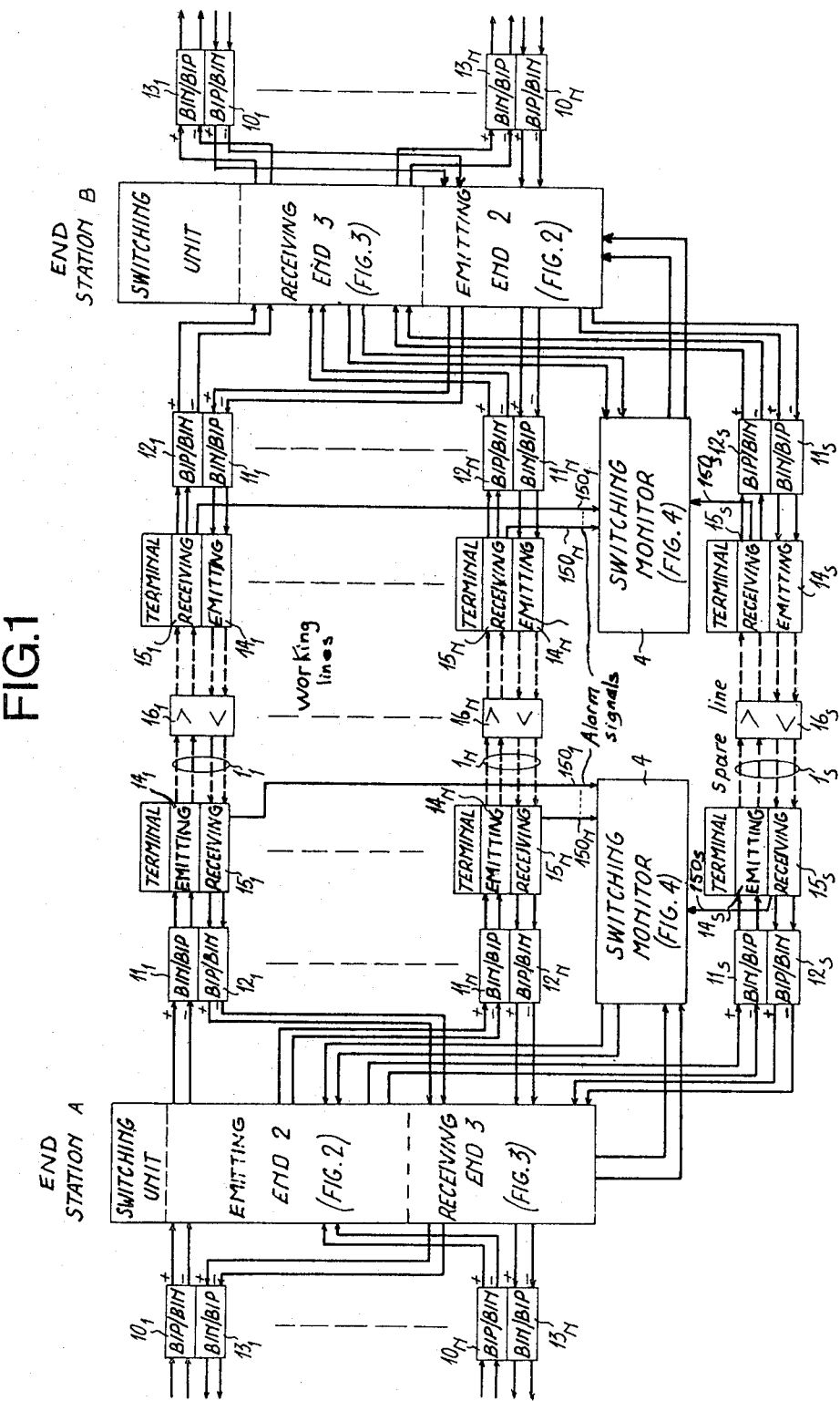
FIG. 1 is a very schematic block diagram of a transmission link with N working lines and one spare line between two end stations of a digital transmission system.

Depicted in FIG. 1 is a bidirectional digital transmission link between two end stations A and B of a digital transmission system. It is assumed that this link is composed of N bidirectional digital working lines $1_1$ to $1_N$, for example 19 of them, and of $P=1$ bidirectional digital spare line $1_S$. Each digital line has, for example, a flow rate of 2048 kbit/s and is of the balanced cable pair type. The two end stations A and B include for the two transmission directions A to B and B to A all the means for remotely monitoring each transmission line. The remote monitoring means include particularly means for remotely locating transmission faults, remote supplying means, alarm indicating means controlled by the remote locating means, etc. Only the equipment of the end stations for relieving the so-called working lines $1_1$ to $1_N$ is described in detail hereinafter.

It will be noted from the outset that for each end station A or B the term "emission" refers to the transmission or to equipment for transmitting a signal from said station A, B to the other station B, A and the term "reception" refers to the transmission or to equipment for transmitting a signal in the opposite direction, i.e. from the other station B, A to said station A, B. As the structure and organization of the end stations are identical, the same reference numbers are used hereinafter to designate the equipment dealing with identical functions as much in one station as in the other. In order to describe the relief equipment included in the stations, reference is be made below for example to the station A, to the left on FIG. 1, the emission direction being from A to B and the reception direction being from B to A.

Each digital working line $1_1$ to $1_N$ receives from upstream and emits downstream with respect to station A, digital signals with a HDBn bipolar line code, such as HDB3 code, according to a preferred embodiment. The digital data and order signals processed in station A or, more exactly, in the emitting end 2 and receiving end 3 of the station switching unit are two binary signals HDBn+ and HDBn− which respectively represent the positive and negative pulses of a bipolar signal. Thus, the bipolar signal received upstream of the station A in the direction A to B one of the lines is converted into two binary signals HDBn+ and HDBn− in one of bipolar-to-binary converters $10_1$ to $10_N$, respectively having two corresponding output wires $10_1{}^+$ to $10_N{}^+$ and $10_1{}^-$ to $10_N{}^-$. Output wires $10_1{}^+$ to $10_N{}^-$ and $10_1{}^+$ to $10_N{}^-$ are respectively connected in normal operation to two inputs $11_1{}^+$ to $11_N{}^+$ and $11_1{}^-$ to $11_N{}^-$ of binary-to-bipolar output converters $11_1$ to $11_N$, via the emitting end 2 of the switching unit. In the other transmission direction from B to A, one of bipolar-to-binary converters $12_1$ to $12_N$ converts the bipolar signal transmitted from the station B along one of lines $1_1$ to $1_N$ into two binary signals HDBn+ and HDBn−. The outputs $12_1{}^+$ and $12_N{}^+$ and $12_1{}^-$ to $12_N{}^-$ of each of converters $12_1$ to $12_N$ are are respectively connected to two inputs $13_1{}^+$ to $13_N{}^+$ and $13_1{}^-$ to $13_N{}^-$ of binary-to-bipolar converters $13_1$ to $13_N$, via receiving end 3 of the switching unit in station A. It will be noted that each of converters $10_1$ to $10_N$ and $13_1$ to $13_N$ can be connected, via a terminal and/or a switching unit, to a similar digital line with a flow rate of 2048k bit/s or, if necessary, to time-division multiplexing and demultiplexing means when the link downstream of the station A in the reception direction B to A is composed of lines of higher flow rate, e.g. 8448k bit/s, or of lower flow rate, e.g. 64k bit/s which corresponds to that of a subscriber telephone channel.

As schematically illustrated in FIG. 1, each digital working line 1 to $1_N$ or each spare line, such as $1_S$, going from station A includes in addition to a pair of binary-to-bipolar and bipolar-to-binary converters $11_1$–$12_1$ to $11_N$–$12_N$, and $11_S$–$12_S$, a line terminal on station A side, a plurality of bidirectional repeaters $16_1$ to $16_N$, $16_S$ and another line terminal on station B side. Each terminal comprises emitting circuits $14_1$ to $14_S$, respectively receiving bipolar signals from the converters $11_1$ to $11_S$, and receiving circuits $15_1$ to $15_S$, for respectively transmitting signals received from the other station via the lines $1_1$ to $1_S$, to the converters $12_1$ to $12_S$. This well-known type of digital terminal comprises a bidirectional repeater, means for line-code shaping in the useful frequency band as well as data signal restoration means, and circuits coupled to the line by separating filters for introducing and detecting the remote-supply, the monitor signals (pilot signals, remote-locating signals, etc) in relation to the line $1_1$ to $1_S$.

In particular, each of the receiving circuits $15_1$ to $15_S$ of a terminal comprises a detecting circuit for respectively detecting transmission faults in the lines $1_1$ to $1_S$ along the reception direction, i.e. B to A for the station A terminals. Each of the fault detecting circuits detects, inter alia, one of the following transmission faults along the reception direction:

remote supply failure;

loss of rate in the received signal, i.e. absence of clock;

error rate higher than a predetermined error rate, as found by checking the line code of the digital received signal (in the particular embodiment where the signal is in HDBn code, detection of bipolarity violation errors); and absence of the digital received signal which corresponds to at least one cut-off in a line section between two repeaters 16 or at least one component equipment of a repeater or, more generally, detection signal attenuation due to losses through, for example, Joule effect in a repeater or through poor self-regulation of the amplification gain in a repeater.

Upon the detection of a transmission fault such as one of these, a receiving circuit $15_1$ to $15_S$ of a faulty line transmits an alarm signal along a wire $150_1$ to $150_S$ to the switching monitor 4 of the station and as is in the prior art, an alarm indication signal (AIS) downstream of the receiving circuit, so as to advise the remote stations and the remote switching exchange that the line is momentarily out of order. As seen infra, an alarm signal triggers switching monitor 4 so the digital transmission on the faulty working line $1_1$ to $1_N$ is switched over to a spare line $1_S$. If the faulty line is a spare line monitor 4 may switch the signals transmitted therein over to another free spare line.

Figure 2:
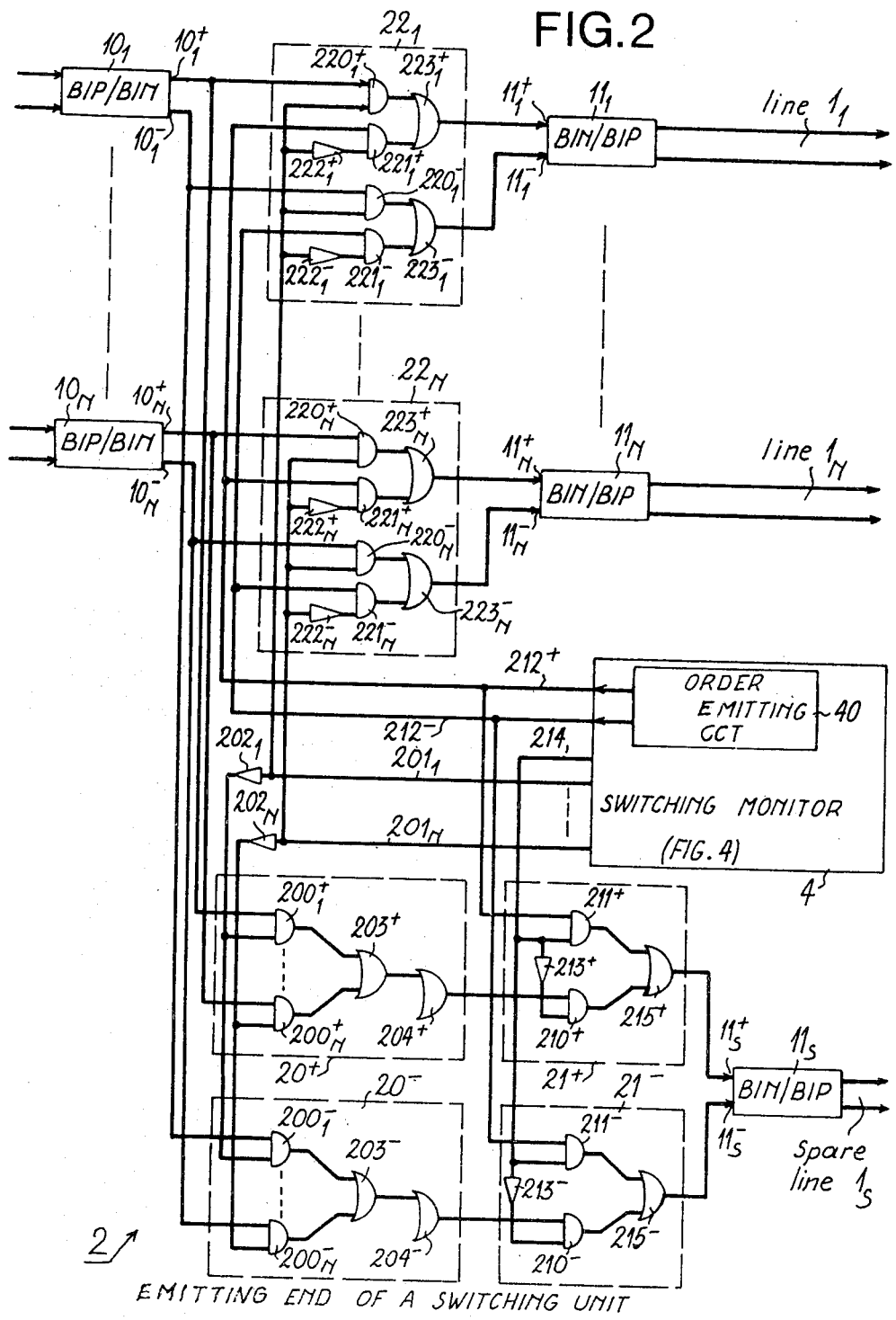
FIG. 2 is a detailed block diagram of the emitting end of the switching unit of an end station.

Reference is now made to FIG. 2, a circuit diagram of the emitting end of a switching unit in a station A or B wherein selecting and switching circuits $20^+$, $20^-$, $21^+$ and $21^-$ are included in the emitting end of known switching units. The circuits $20^+$ and $20^-$ handle the selection of the faulty line amongst N working lines $1_1$ to $1_N$. Circuits $20^+$ and $20^-$ each comprise N AND gates $200_1^+$ to $200_N^+$, $200_1^-$ to $200_N^-$ having digital inputs respectively connected to outputs $10_1^+$ to $10_N^+$, $10_1^-$ to $10_N^-$ of bipolar-to-binary converters $10_1$ to $10_N$. The control inputs of the pairs of AND gates $200_1^+$–$200_1^-$ to $200_N^+$ to $200_N^-$ are respectively connected via inverters $202_1$ to $202_N$ to wires $201_1$ to $201_N$ of an address bus, connected to a output of switching monitor 4. The outputs of AND gates $200_1^+$ to $200_N^+$, $200_1^-$ to $200_N^-$ of selecting circuits $20^+$, $20^-$ are respectively connected via OR gates $203^+$, $203^-$ and, perhaps via second OR gates $204^+$, $204^-$, according to other embodiments, to the digital input of AND gates $210^+$, $210^-$ of the corresponding switching circuit $21^+$, $21^-$. AND gates $211^+$, $211^-$ of the circuits $21^+$, $21^-$ make it possible to introduce order signals from order emitting circuit 40 of the monitor 4 via digital output wires $212^+$, $212^-$. The control inputs of AND gates $210^+$, $210^-$ and $211^+$, $211^-$ of each of switching circuits $21^+$, $21^-$ are respectively connected to switching control wire 214 at the output of switching monitor 4; the connections are via inverters $213^+$, $213^-$, as well as direct connections between the wire and gates $211^+$ and $211^-$. The outputs of AND gates $210^+$, $211^+$ and the outputs of AND gates $210^-$, $211^-$ are connected, via OR gates $215^+$ and $215^-$, to respective inputs $11_S^+$ and $11_S^-$ of binary-to-bipolar converter $11_S$.

When the switching monitor 4 detects an alarm signal one wire $150_k$ of wires $150_1$ to $150_N$ (where k can selectively be every one of 1 to N) corresponding to faulty line $1_k$ in the reception transmission direction, it emits a signal along wire $201_k$ for opening gates $200_k^+$ and $200_k^-$. Simultaneously, the monitor 4 emits a signal along the wire 214 in order to close AND gates $211^+$ and $211^-$ and to open AND gates $210^+$ and $210^-$ such that the data digital signal travels trough the switching unit from bipolar-to-binary converter $10_k$ to binary-to-bipolar converter $11_S$ of spare line $1_S$. Normally, in the absence of any relief, gates $210^+$ and $210^-$ are closed and gates $211^+$ and $211^-$ are opened to allow the emission via the spare line $1_S$, of digital order signals from the monitor 4 of the station in question to order receiving circuit 41 of the monitor 4 in the other station. It will be noted that, according to the article by A. Chomette et al., outputs $10_1^+$, $10_1^-$ to $10_N^+$, $10_N^-$ of bipolar-to-binary converters $10_1$ to $10_N$ are permanently connected directly to inputs $11_1^+$, $11_1^-$ to $11_N^+$, $11_N^-$ of converters $11_1$ to $11_N$ on lines $1_1$ to $1_N$. Consequently, it can be seen that, after working line $1_k$, has been relieved, to re-establish the normal state after the repair thereof, the digital transmission along the spare line must be initially interrupted in order to exchange orders which provide for the simultaneous switching of data transmission on spare line $1_S$ over to repaired line $1_k$ in the two end stations A and B.

In accordance with the invention, the emitting end 2 of the switching unit of an end station also comprises data and order signal switching circuits $22_1$ to $22_N$ which are respectively assigned to working lines $1_1$ to $1_N$. Each of circuits $22_1$ to $22_N$ comprises two AND gates $220_1^+$ to $220_N^+$ and $220_1^-$ to $220_N^-$ and two AND gates $221_1^+$ to $221_N^+$ and $221_1^-$ to $221_N^-$. The digital inputs of AND gates $220^+$ and $220^-$ of a particular circuit $22_k$ are connected to outputs $10^+$ and $10^-$ of the corresponding bipolar-to-binary converter 10. The digital inputs of AND gates $221^+$ and $221^-$ of circuit $22_k$ are connected to output wires $212^+$ and $212^-$ of order emitting circuit 40. The control inputs of AND gates $220^+$ and $220^-$ of the circuit 22 are directly connected to the corresponding output wire 201 of the switching monitor 4. The control inputs of gates 221+ and 221− are connected via two inverters 222+ and 222− to corresponding wire 201. The outputs of gates 220+ and 221+ and the outputs of gates 220− and 221− are connected, via two OR gates 222+ and 222−, to inputs 11+ and 11− of the corresponding binary-to-bipolar converter $11_k$.

In accordance with the invention, when a working line $1_k$ has to be relieved, gates $200_k+$, $200_k-$, 210+, 210− are opened and gates 211+, 211−, are closed simultaneously with the closing of gates $220_k+$ and $220_k-$ and the opening of gates $221_k+$ and $221_k-$. Opening of gates $221_k+$ and $221_k-$ permits the second exchange of digital order signals between end stations when the line $1_k$ is repaired, without breaking the data transmission along the spare line and prior to switching for reverting to normal operation.

Figure 3:
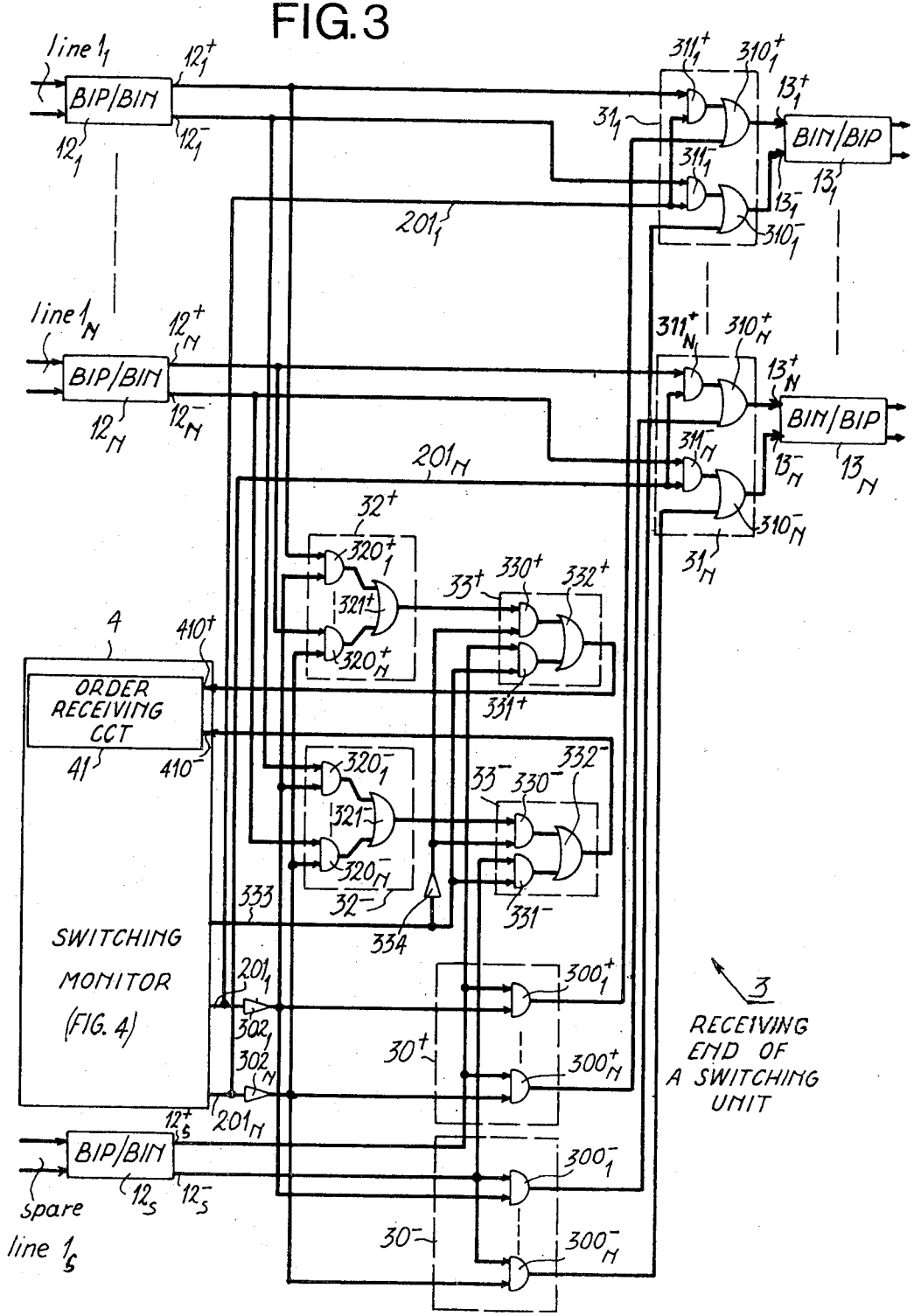
FIG. 3 is a detailed block diagram of the receiving end of the switching unit of an end station.

FIG. 3 is a circuit diagram of the receiving end 3 of a switching unit in an end station A or B. Receiving end 3 comprises, in a known manner, two line selecting circuits 30+, 30− in the reception direction and N switching circuits $31_1$ to $31_N$ between the working lines and the spare line $1_S$.

The selecting circuits 30+ and 30− are respectively assigned to the two digital signals HDBn+ and HDBn− which are delivered from outputs $12_S+$ and $12_S-$ of the bipolar-to-binary converter $12_S$ of the spare line. The binary signal HDBn+ is fed to the digital inputs of N AND gates $300_1+$ to $300_N+$ of the circuit 30+ and the other binary signal HDBn− is fed to the digital inputs of N AND gates $300_1-$ to $300_N-$ of the circuit 30−. Each pair of AND gates $300_1+$–$300_1-$ to $300_N+$–$300_N-$ is controlled by the corresponding wire $201_1$ to $201_N$, via an inverter $302_1$ to $302_N$. The outputs of two associated gates 300+–300− are connected, via two OR gates 310+ and 310− of the respective switching circuit 31, to inputs 13+ and 13− of the binary-to-bipolar converter 13. A switching circuit 31 further comprises two AND gates 311+ and 311−, having digital inputs are connected to outputs 12+ and 12− of corresponding bipolar-to-binary converter outputs $12_k$ having connected, via two OR gates 310+ and 310−, to inputs 13+ and 13− of the converter $13_k$. The control inputs of gates 311+ and 311− are connected directly to the associated wire 201.

Furthermore, still in accordance to the above prior art, the outputs $12_S+$ and $12_S-$ of the spare line converter $12_S$ are connected directly to the inputs of the order receiving circuit 41 of the switching monitor 4.

It can be seen that according to prior art, the order receiving circuit 41 is always connected to the spare line $1_S$ and that the signal conveyed by a working line $1_1$ to $1_N$ can only be delivered downstream of the end station, in particular via the binary-to-bipolar converter $13_1$ to $13_N$. Consequently, to receive order signals from the order emitting circuit 40 of the other end station, AND gate 300+ and 300− corresponding to the relieved line is closed and the digital transmission along the spare line is therefore broken, before re-establishing this transmission along the repaired line.

In accordance with the invention, the receiving end 3 of a switching unit also comprises two selection circuits 32+ and 32− which select the ends of the working lines $1_1$ to $1_N$ on the reception side, and two switching circuits 33+ and 33−. These additional circuits 32+, 32−, 33+ and 33− make it possible to switch the transmission of the orders received, after a line has been repaired, from the spare line to the repaired line and, after an exchange of orders at the end of the repair procedure, from the repaired line to the spare line.

Selection circuits 32+ and 32− respectively comprise N AND gates $320_1+$ to $320_N+$ and $320_1-$ to $320_N-$, as well as OR gates 321+ and 321−; inputs to the OR gates are connected to the outputs of the preceding AND gates. The binary inputs of two associated AND gates 320+ and 320− are connected to outputs 12+ and 12− of the corresponding bipolar-to-binary converter 12.

A pair of gates 320+–320− is controlled by the switching monitor 4 via the corresponding wire 201 and inverter 302. In each switching circuit 33+, 33−, an AND gate 330+, 330− has a binary input which is connected to the output of the corresponding OR gate 321+, 321−, and another AND gate 331+, 331− has a binary input which is connected to the output $12_S+$, $12_S-$ of the spare line bipolar-to-binary converter $12_S$. The outputs of gates 330+ and 331+ are connected to positive input 410+ of the order receiving circuit 41, via an OR gate 332+. Similarly, the outputs of gates 330− and 331− are connected to the negative input 410− of the order receiving circuit 41, via an OR gate 332−. The control inputs of gates 330+ and 330− are connected to the monitor 4 by a wire 333 and an inverter 334, whilst the control inputs of gates 331+ and 331− are connected directly to the wire 333.

As a result, according to the invention, while a relieved line is malfunctioning, the spare line $1_S$ is connected to order receiving circuit 41 via converter $12_S$, enabled AND gates 331+, 331− and OR gates 332+, 332−. However, as soon as the line has been repaired, i.e. transmission of the alarm signal along wire 150 between the terminal concerned and the switching monitor 4 has ceased, the repaired digital line is connected to order receiving circuit 41 via corresponding enabled AND gates 320+, 320−, 330+, 330− so the second exchange of order signals precedes between the end stations for the normal reestablishment of the repaired line, without breaking the digital data flow.

FIG. 4 is a very schematic block diagram of the internal organization of the switching monitor 4. Switching monitor 4 is preferably organized around a microprocessor which mainly makes up control unit 42. The software of the microprocessor can be fitted to the number N of working lines $1_1$ to $1_N$ and to the number P of spare lines, such as $1_S$, and to various embodiments of the end stations A and B (number of switching units greater than 1, in particular) and to successions of the relief procedure phases. Notable states of the different stores mentioned later and the separate control of certain phases in the procedure can be supplied and achieved by means of a display panel (not shown) of an alphanumeric character and with a keyboard allowing man-machine conversation.

In addition to emitting and receiving circuits 40, 41 and control unit 42, the switching monitor 4 comprises an alarm detecting circuit 43, a faulty line address store 44, a relieved working line address store 45, a priority circuit 46, a spare line state store 47 and an addressing circuit 48 which addresses or selects the working lines $1_1$ to $1_N$. The functions of these various circuits are given in detail hereinafter during the presentation of prefered relief examples.

It is first of all assumed that at an initial given time, the spare line is free of any digital data or order signal transmission. As a result, the stores 44 and 45 do not contain any address and the state store 47 is in the so-called "free spare line" state. It will be noted that the state store 47 can be composed of four flip-flops which are controlled, via a bidirectional bus 470, by the control unit 42. The four flip-flops respectively store binary signals to indicate the free state, the state occupied by the transmission of order signals, the state occupied by the transmission of a data signal corresponding to a relieved line $1_1$ to $1_N$ and the fault state in relation to the spare line. Moreover, as known, only receiving circuits 15 of line terminals of the two end station signal the transmission faults along the two reception directions for the two stations respectively. Because the repair of a line section or a group of repeaters calls for a momentary transmission cut-off along both directions, it is assumed hereinafter that any fault detected in one direction means that the transmission along the line in both directions must be stopped.

After said initial time, it is assumed that transmission line $1_3$ is faulty and that its terminal receiving circuit $15_3$ of the end station feds the corresponding wire $150_3$ amongst $N+1$ alarm wires $150_1$ to $150_N$, $150_S$ permanently in logic state "1". The latter wires are connected to the inputs of alarm detecting circuit 43 and to the control unit 42 via alarm indicating monostable flip-flops $421_1$ to $421_S$ on the one hand, and via alarm end monostable flip-flops $425_1$ to $425_S$ on the other hand. Each time an alarm signal is transmitted along one of wires 150, the output of the corresponding monostable flip-flop 421 delivers an alarm indicating pulse to the control unit 42.

The alarm detecting circuit 43 feeds the line address corresponding to the wire 150 which goes over from state "0" (normal operation) to state "1" (alarm) to a free cell of the fault line address store 44. A change in state of wire $150_S$ is indicated by circuit 43 to unit 42 through a signal delivered along wire $430_S$. According to the considered example, the circuit 43 delivers the address of the line $1_3$, via a bus $430_L$ to the store 44.

Following on from this recording phase, the control unit 42 moves on to the next step relating to the priority analysis of faulty line $1_3$. For this purpose, unit 42 orders, via buses 422 and 423, reading of (a) the first cell in the store 44, which contains the address of line $1_3$, and (b) the relieved working line address store 45. In fact, each address word delivered from the alarm detecting circuit 43 comprises two parts, respectively made up of an identification word of the faulty line and of a priority order word. The latter indicates the priority of a line $1_1$ to $1_N$ with respect to the others. If two faulty lines occur at the same time, the priority order words indicate whether one of the lines must be relieved by the spare line on priority, to the detriment of an interruption in the data transmission of the other line. The other line remains interrupted until it is repaired or is relieved after repair of the priority line and freeing of the spare line. The priority order words are then transmitted via buses 440 and 450 to the priority circuit 46 which compares them and delivers, along a wire 460 to the control unit 42, a signal indicating whether or not the line currently relieved has priority with respect to the line whose address has just been recorded in the store 44. According to the preceding example, since the store 45 is empty, the preceding comparison is positive and the unit 42 causes the address of line $1_3$ read in the store 44 to be written in the store 45, via the bus 441.

Next, control unit 42 moves on to the following step relating to the exchange of order signals between the end stations A and B, by supplying a first signal via bidirectional bus 424 to order circuit 40-41 of the station A and a reading-signal via wire 422 to relieved working line address store 45. Store 45 responds to the signal on wire 422 to transfer, via a bus 450, the address word of the line $1_3$ to be relieved by order emitting circuit 40. Order emitting and receiving circuits 40-41 constitute a bidirectional terminal equipment of the data processing type working in packet-mode. The access procedure to this type of terminal is, for example, of the so-called High Data Link Control (HDLC). In this step, the purpose of this first exchange of order signals is to invite the end station B to disconnect faulty line $1_3$, should receiving circuit $15_3$ of the station B not have transmitted an alarm signal along the corresponding wire $150_3$, or to confirm through one of the stations to the other that receiving circuit $15_3$ has detected an alarm signal related to faulty line $1_3$, which corresponds to a transmission fault along the two transmission directions. For example, in the first case, station B is interrogated by station A with transmission of line $1_3$ address and reception acknowledgement from station B.

These order signals are emitted through emitting end 2 (FIG. 2) of the switching unit of each end station and are received in the receiving end 3 (FIG. 3) of the switching unit of the other end station along the two transmission directions on spare line $1_S$, by routing along the following elements: order emitting circuit 40, wires $212^+$, $212^-$, enabled AND gates $211^+$, $211^-$, OR gates $215^+$, $215^-$, binary-to-bipolar converter $11_S$ and the emitting circuit of terminal $14_S$ of one of end stations A or B, then spare line $1_S$, the receiving circuit of terminal $15_S$, bipolar-to-binary converter $12_S$, enabled AND gates $331^+$, $331^-$, OR gates $332^+$, $332^-$ and order receiving circuit 41 of the other end station B or A.

After detection of the reception acknowledgement which is transmitted in the form of an appropriate signal along the bidirectional bus 424 from the order receiving circuit 41 to the control unit 42 in each end station, the control units 42 of the end stations go simultaneously ahead with the switching step. After the switching step, the digital data signal is conveyed from the bipolar-to-binary converter $10_3$ of one of end stations A or B to the binary-to-bipolar converter $13_3$ of other station B or A, via the spare line $1_S$, in relation to the two transmission directions. Also after the switching step the outputs of order emitting circuits 40 are connected to the faulty line $1_3$ and the inputs $410^+$, $410^-$ of the order receiving circuits 41 are connected to the spare line $1_S$ as the preceding step.

With this in mind, the control unit 42 controls relieved working line address store 42 via bus 422, and the address of line $1_3$ is transferred from the store 45 to the addressing circuit 48 via a bus 451. Each time addressing circuit 48 receives a line address from store 45 via line 451, it sets the corresponding wire of its output bus to state "0"; in the stated example wire $201_3$ is set to state "0". This change of state is controlled by control unit 42 changing wire 214 going from state "1" to "0". In this way, simultaneously, in the switching unit emitting end 2 of each end station (FIG. 2):

AND gates $220_3^+$ and $220_3^-$ are disabled and AND gates $221_3^+$ and $221_3^-$ are enabled, such that output wires $212^+$, $212^-$ of order emitting circuit 40 are connected to binary-to-bipolar converter $11_3$ of line $1_3$ at the station output; and AND gates $200_3^+$, $200_3^-$, $210^+$ and $210^-$ are enabled and AND gates $211^+$, $211^-$ are disabled, such that the data signal transmitted from outputs $10_3^+$, $10_3^-$ of bipolar-to-binary converter $10_3$ is delivered to inputs $11_S{}^+$, $11_S{}^-$ of binary-to-bipolar converter $11_S$ of spare line $1_S$; and in the switching unit receiving end 3 of each end station:

AND gates $311_3{}^+$ and $311_3{}^-$ are disabled and AND gates $300_3{}^+$ and $300_3{}^-$ are enabled, such that the data signal transmitted from the other station is coupled in the switching unit from outputs $12_S{}^+$, $12_S{}^-$ of bipolar-to-binary converter $12_S$ of spare line $1_S$ to outputs $13_3{}^+$, $13_3{}^-$ of binary-to-bipolar converter $13_3$; and AND gates $320_3{}^+$ and $320_3{}^-$ are enabled so as to be ready to receive digital order signals after repair of line $1_3$; however, AND gates $330^+$, $330^-$ are held disabled and AND gates $331^+$, $331^-$ are held enabled, such that the digital data signal transmitted by the spare line is received at inputs $410^+$, $410^-$ of the order receiving circuit 41.

Since circuit 41 is no longer in the order exchange state, it inhibits the data signal received at the time; circuit 41 is, however, ready to receive order signals through spare line $1_S$, should a priority line on line $1_3$ become faulty, as will be described below.

If order receiving circuit 41 were not connected to the spare line at this point in the procedure, i.e. if it were connected to the outputs of bipolar-to-binary converter $12_3$ of line $1_3$ to be repaired, no order signal could be exchanged between end stations A and B before repair of line $1_3$.

It thus appears that this first switch-over causes practically no break in the data signal which is normally carried along faulty line $1_3$, since the data signal is immediately transferred over to spare line $1_S$ in response to the detection of the alarm signal on the wire $150_3$.

After in-situ repair of line $1_3$, the wire $150_3$ reverts to state "0" in the end stations A and B. This state change is detected in the monostable flip-flop $425_3$ which delivers a so-called alarm-end pulse to the control unit 42 (FIG. 4). In both end stations, wires 333 are simultaneously set to state "0" under control of units 42. This causes disabling of gates $331^+$, $331^-$ and enabling of gates $330^+$, $330^-$, in the receiving end 3 of each switching unit (FIG. 3). Then the end stations A and B can mutually confirm line $1_3$ being re-established, through a second order signal routing for the two transmission directions such as: order emitting circuit 40, enabled AND gates $221_3{}^+$, $221_3{}^-$, OR gates $223_3{}^+$, $223_3{}^-$ and binary-to-bipolar converter $11_3$ in emitting end 2 (FIG. 2) of one of stations A or B, and bipolar-to-binary converter $12_3$, enabled AND gates $320_3{}^+$, $320_3{}^-$, OR gates $321^+$, $321^-$, enabled AND gates $330^+$, $330^-$, OR gates $332^+$, $332^-$ and order receiving circuits 41 in receiving end 3 (FIG. 3) of the other station B or A.

Once this second exchange of order signals has been accomplished, the control unit 42 of the stations A and B establish the inverse of the initial switching in order to restore normal transmission along repaired line $1_3$. With this in mind, in each end station, wires $201_3$, 214 and 333 are reset to state "1". In the emitting end 2 of each switching unit (FIG. 2), AND gates $220_3{}^+$, $220_3{}^-$ are re-enabled and AND gates $221_3{}^+$, $221_3{}^-$ are disabled. In the receiving end of each switching circuit (FIG. 3), AND gates $311_3{}^+$, $311_3{}^-$ are enabled and AND gates $300_3{}^+$, $300_3{}^-$ are disabled. This re-establishes normal transmission, via line $1_3$, from bipolar-to-binary converter $10_3$ of one of the stations to binary-to-bipolar converter $13_3$ of the other station. In addition, an exchange of order signals can be carried out again, via spare line $1_S$, since AND gates $200_3{}^+$, $200_3{}^-$, $210^+$, $210^-$, $320_3{}^+$, $320_3{}^-$, $330^+$, $330^-$ are now disabled and AND gates $211^+$, $211^-$, $331^+$, $331^-$ are re-enabled. At the end of this step, the address store 45 is set to zero and the spare line state store 47 goes over to the so-called "free" state or state "occupied by orders".

Other successions of relief procedure steps for a faulty line can be controlled by a control unit 42. These operations depend primarily on the states of stores 45 and 47 when an alarm indicating signal is transmitted from a monostable flip-flop 421 to the control unit 42.

Should address store 45 contain the address of a presently relieved line, such as $1_8$, and should the state store 47 indicate the spare line as being occupied, two cases can arise. The first case concerns the priority of spare line $1_8$ over last failed line $1_3$. The comparison in priority circuit 46 is then negative and line $1_3$ is not relieved until line $1_8$ is repaired. In this respect, at the end of each relief procedure restoring the functioning of the previously relieved line, unit 42 reads the contents of the cells in store 44 which correspond to the lines, such as $1_3$, awaiting relief. Unit 42 performs the relief procedure on the failed line having the highest priority. Were two faulty lines to have the same priority word, one of them is arbitrarily selected to be relieved.

However, if the relieved line $1_8$ does not have priority over the line $1_3$, the comparison of priority words in circuit 46 is positive. At this time, if memory 47 is in the state "occupied by orders", control unit 42 delivers a signal, via bus 424, to the order emitting circuit 40. This signal indicates that the procedure in progress must be superseded by a new relief procedure relating to line $1_3$. As spare line $1_S$ is in direct relation with the order circuits, no switching is required to start the new relief procedure.

Store 47 is in the state "occupied by the transmission of a data signal". In the present case, this signal is the one that should normally have been transmitted on line $1_8$. It is then necessary to re-establish the normal connection in relation to line $1_8$, although it is faulty, before going ahead with relieving priority line $1_3$. To this end, the information corresponding to line $1_8$, transmitted along the spare line, is broken in both transmission directions before an exchange of orders takes place along spare line $1_S$ between the two end stations. Then, simultaneously, in the two end stations:

AND gates $220_8{}^+$, $220_8{}^-$ are enabled and AND gates $221_8{}^+$, $221_8{}^-$ are disabled thereby connecting converters $10_8$ and $11_8$ with each other as AND gates $200_8{}^+$, $200_8{}^-$, $210^+$, $210^-$ are disabled and AND gates $211^+$, $211^-$ are enabled thereby connecting outputs $212^+$, $212^-$ of order emitting circuit 40 to inputs $11_S{}^+$, $11_S{}^-$ of binary-to-bipolar converter $11_S$ of spare line $1_S$ (FIG. 2); and AND gates $320_8{}^+$, $320_8{}^-$, $300_8{}^+$, $300_8{}^-$ are disabled and AND gates $311_8{}^+$, $311_8{}^-$ are enabled thereby into connecting converters $12_8$ and $13_8$ (FIG. 3).

The relief procedure, as described hereabove, is triggered in relation to line $1_3$.

Lastly, another case concerns the state of store 47 indicating a failure in spare line $1_S$, as signalled by the change to state "1" of one or two wires $150_S$ connected to the spare line terminals; the change of state is coupled to one of units 42, by a signal which is delivered along wire $430_S$ from the alarm detecting circuit 43. In this case, a new alarm has no effect, whereby the faulty lines remaining in the initial transmission state thereof, and the procedure on the line possibly relieved at this step is continued unless it is at the first exchange-of-orders stage. In the opposite case, the line which should have been relieved is held in its initial state, and corresponding converters 10 and 11 stay connected, as do corresponding converters 12 and 13 in each of the stations.

In another lay-out embodiment (not shown) of end stations A and B, the link of lines $1_1$ to $1_N$ comprises, for relief purposes, P spare lines $1_{S1}$ to $1_{SP}$. If, for example, N=19 P is equal to 3. Switching unit emitting end 2 in each station comprises P selecting circuits $20_1{}^+-20_1{}^-$ to $20_P{}^+-20_P{}^-$ and P switching circuits $21_1{}^+-21_1{}^-$ to $21_P{}^+-21_P{}^-$ that are respectively identical to circuits $20^+-20^-$ and circuits $21^+-21^-$ already described. All AND gates $200^+-200^-$ with the same index in circuits $20_1{}^+-20_1{}^-$ to $20_P{}^+-20_P{}^-$ have digital inputs thereof respectively connected; on the other hand, these AND gates are controlled by separate control wires. The output bus of addressing circuit 48 in switching monitor 4 comprises N×P wires $201_1$ to $201_{NP}$. P wires, such as 214, control switching circuits $21_1{}^+-21_1{}^-$ to $21_P{}^+-21_P{}^-$. The control wires, such as $201_1$, $201_{P+1}$, $201_{2P+1}$ . . . control, via an OR gate, the opening and closing of the AND gates inserted in the selecting circuits, such as $22_1$. Likewise, the receiving end 3 of the switching unit of each end station comprises P selecting circuits $32_1{}^+-32_1{}^-$ to $32_P{}^+-32_P{}^-$, P switching circuits $30_1{}^+-30_1{}^-$ to $30_P{}^+-30_P{}^-$, and P switching circuits $33_1{}^+-33_1{}^-$ to $33_P{}^+-33_P{}^-$ controlled, via a bus of P wires $333_1$ to $333_P$, by monitor 4. In addition, this monitor 4 comprises P state stores for spare lines $47_1$ to $47_P$, a relieved working line address store 45 having P cells and P order signal emitting and receiving circuits $40_1-41_1$ to $40_P-41_P$. A lay-out such as this simultaneously enables P of the working lines amongst N to be relieved. Each time an alarm is detected by monitor 4, the state of the various spare lines is read and the first detected "free" line is assigned to transmitting the faulty line data. In practice, this gives rise to no break in the data transmission along the complete transmission link, since the probability of P=3 working lines being simultaneously out of order is virtually non-existent.

Finally, in a further embodiment, instead of a switching unit being associated with P spare lines in each end station, P switching unit and P switching monitors can be provided. The transmission link then comprises P×N working lines and P spare lines. Each emitting end in a switching unit comprises P selecting circuits, such as circuits $20^+-20^-$ one of which is provided with 2 (P−1) AND gates which are respectively connected to OR gates $204^+$ and $204^-$ (FIG. 2). This enables the outputs of the emitting ends of other switching unit to be connected to the input of the emitting end of the switching unit in question. The outputs of OR gates $204^+$ and $204^-$ of the other P−1 selecting circuits make it possible to connect P−1 outputs of the considered switching unit emitting end with the inputs of the emitting end of the other switching units. Similarly, the receiving end of a switching unit comprises, in this embodiment, P switching circuits, such as $30^+-30^-$, allowing the spare line of the switching unit in question and the outputs of P−1 other switching units to be connected to the said switching unit in question, and P−1 other switching circuits which make it possible to connect the spare line of the switching unit in question to the inputs of P−1 other switching units. A lay-out of this type also contributes to enhancing the relief, since, if a spare line of a switching unit is already used for transmitting data, a free line in another switching unit can be used for conveying the data signal assigned to a second faulty line which is assigned to the first switching unit in question. Of course, in this last embodiment, there is a direct exchange of orders between switching monitors 4 in the same end station.

What we claim is:

1. An end station for a system for relieving a plurality of bidirectional digital data transmission working lines connected between two of the end stations of a digital transmission system including a plurality of bidirectional digital transmission spare lines connected between said end stations, said end station comprising:
   means for detecting transmission faults on each of said working lines,
   means for selecting a free spare line in response to the detection of transmission faults on a working line,
   means for emitting digital order signals to the other end station,
   means for receiving digital order signals from said other end station,
   first and second switching means for connecting said order signal emitting and receiving means to a selected free spare line such that said order signal emitting and receiving means of said end stations exchange first order signals therebetween in response to the detection of a transmission fault on said working line, and for connecting the emitting and receiving ends of said faulty working line to said selected free spare line in response to said first order signals from said other end station,
   third switching means for connecting said order signal emitting means to said faulty working line such that said order signal emitting means transmits second order signals on said faulty working line in response to said first order signals from said other end station,
   fourth switching means for connecting said order signal receiving means to said working line in response to the transmission fault no longer being detected by the detecting means and said working line being repaired;
   said transmission fault detecting means controlling said first, second, third and fourth switching means in response to said second order signals received in said order signal receiving means such that emitting and receiving ends of said repaired working line are connected to said working line and are disconnected from said selected spare line;
   said order signal receiving means holding a connection to said selected spare line from a time at the start of exchange of said first order signals and up to just before the transmission fault on said working line is no longer being detected by the detecting means such that said order signal receiving means can receive order signals from said other end station on said selected spare line in response to a transmission fault which relates to another working line and which is detected in said other end station.

2. The end station of claim 1 wherein the code used on said working and spare lines is an HDBn code and the code used in said end station comprises negative and positive binary codes corresponding to said HDBn code.

3. The end station of claim 2 wherein, for each working line, the emitting means of each end station is interconnected between line code-to-binary code converting means and binary code-to-line code converting means and the receiving means of each end station is interconnected between line code-to-binary code converting means and binary code-to-line code converting means and, for each spare line, said emitting means and receiving means of each station are connected to said spare line through binary code-to-line code converting means and line code-to-binary code converting means and wherein said first, second, third and fourth switching means are analogous with two-position bipolar switches.

4. An end station for a system for relieving a plurality of bidirectional digital data transmission working lines connected to two of the end stations of a digital transmission system including a plurality of bidirectional digital spare lines connected between said end stations, said end station comprising:

means for detecting transmission faults on each of said working lines, means connected to said transmission fault detecting means for exchanging with another end station first and second order signals, the first order signals being exchanged on a selected free spare line in response to the detection of a transmission fault on a working line, and the second order signals being exchanged on said working line in response to the detecting means detecting a stop of said transmission fault on the working line, first switching means controlled by said order signal exchanging means for (a) connecting the order signal emitting means of said exchanging means to said spare line in response to said transmission fault being detected on said working line, (b) connecting (i) the emitting end of said working line to said spare line and (ii) said order signal emitting means to said working line in response to said first order signals, and (c) disconnecting said working line from said order signal emitting means in response to said second order signals, and second switching means controlled by said order signal exchanging means for (a) connecting the order signal receiving means of said exchanging means to said spare line in response to said transmission fault being detected on said working line, (b) connecting the receiving end of said working line to said spare line and holding a connection between said order signal receiving means and said spare line in response to said first order signals, (c) disconnecting said order signal receiving means from said spare line and for connecting said order signal receiving means to said working line in response to the transmission fault no longer being detected, and (d) disconnecting said working line from said order signal emitting means in response to said second order signals.

5. The end station of claim 4 wherein said order signal emitting means emits said second digital order signals on said faulty working line during the repair of said faulty working line.

6. The end station of claim 4 wherein said order signal exchanging means comprises means for controlling the relief of one faulty high priority working line by a free spare line before the relief of a faulty working line having a priority less than that of said high priority working line.

7. In combination, a digital transmission system including plural bidirectional digital data transmission working lines, plural bidirectional digital data transmission spare lines, and end stations connected to said working and spare lines, the working lines being relieved by the spare lines; each of the end stations comprising:

means for detecting transmission faults on each of said working lines, means for selecting a free spare line in response to the detection of transmission faults on a working line, means for emitting digital order signals to the other end station, means for receiving digital order signals from said other end station, first and second switching means for connecting said order signal emitting and receiving means to a selected free spare line such that said order signal emitting and receiving means of said end stations exchange first order signals therebetween in response to the detection of a transmission fault on said working line, and for connecting the emitting and receiving ends of said faulty working line to said selected free spare line in response to said first order signals from said other end station, third switching means for connecting said order signal emitting means to said faulty working line such that said order signal emitting means transmits second order signals on said faulty working line in response to said first order signals from said other end station, fourth switching means for connecting said order signal receiving means to said working line in response to the transmission fault no longer being detected by the detecting means and said working line being repaired;

said transmission fault detecting means controlling said first, second, third and fourth switching means in response to said second order signals received in said order signal receiving means such that emitting and receiving ends of said repaired working line are connected to said working line and are disconnected from said selected spare line;

said order signal receiving means holding a connection to said selected spare line from a time at the start of exchange of said first order signals and up to just before the transmission fault on said working line is no longer being detected by the detecting means such that said order signal receiving means can receive order signals from said other end station on said selected spare line in response to a transmission fault which relates to another working line and which is detected in said other end station.

* * * * *